(12) United States Patent
Fuhrman (10) Patent No.: US 10,072,852 B2
(45) Date of Patent: Sep. 11, 2018

(54) ELECTRIC RADIANT HEATING ELEMENT POSITIONING MATS, AND RELATED METHODS

(71) Applicant: Michael Fuhrman, Mill Creek, WA (US)

(72) Inventor: Michael Fuhrman, Mill Creek, WA (US)

( * ) Notice: Subject to any disclaimer, the term of this patent is extended or adjusted under 35 U.S.C. 154(b) by 0 days.

(21) Appl. No.: 14/668,630

(22) Filed: Mar. 25, 2015

(65) Prior Publication Data

US 2015/0276235 A1   Oct. 1, 2015

Related U.S. Application Data

(60) Provisional application No. 61/972,089, filed on Mar. 28, 2014.

(51) Int. Cl.
| | |
|---|---|
| *H05B 1/00* | (2006.01) |
| *H05B 3/00* | (2006.01) |
| *H05B 11/00* | (2006.01) |
| *F24D 13/02* | (2006.01) |

(52) U.S. Cl.
CPC ........... *F24D 13/024* (2013.01); *Y02B 30/26* (2013.01)

(58) Field of Classification Search
CPC ........ F24D 13/024; F24D 3/142; F24D 3/148; F24D 3/14; F24D 13/02; F24D 3/16; F24D 3/144; F24D 3/146; F24D 3/165; Y02B 30/26; H05B 2203/026; H05B 3/34

USPC ..... 219/213, 200, 544, 526; 237/69; 165/49, 165/53; 392/437, 436, 363, 407; 52/220.1
See application file for complete search history.

(56) References Cited

U.S. PATENT DOCUMENTS

| | | | |
|---|---|---|---|
| 5,082,712 A * | 1/1992 | Starp | E04F 15/02411 428/174 |
| 8,020,783 B2 * | 9/2011 | Backman, Jr. | F24D 3/142 165/56 |
| 2009/0026192 A1 * | 1/2009 | Fuhrman | H05B 3/06 219/523 |

(Continued)

*Primary Examiner* — Tu B Hoang
*Assistant Examiner* — Joseph Baillargeon
(74) *Attorney, Agent, or Firm* — Janeway Patent Law PLLC (57) ABSTRACT

A mat includes a base and a plurality of studs that together may position an electric radiant heating element within a floor or wall, and may protect the electric radiant heating element as the floor or wall are constructed. The base extends in at least two directions that define a plane. Two or more of the plurality of studs has a cylindrical body that includes a surface and a top, the surface extends from a respective portion of the base in a third direction that does not lie within the plane and that is at an angle between and including 84 and 96 degrees relative to the respective base portion, and the top includes a hole to allow air to pass from outside the stud to an interior region. By using the mat one can quickly install a plurality of positioning devices to hold the electric radiant heating element at desired locations in the floor while the floor is constructed. Furthermore, one can install the mat in odd-shaped rooms or in rooms that will use an electric radiant heating element that is a branch of another room's electric radiant heating element, without having to first wait for installation in other portions of the odd-shaped room or the other room to be completed.

20 Claims, 4 Drawing Sheets

(56) References Cited

U.S. PATENT DOCUMENTS

2011/0047907 A1* 3/2011 Smolka ............... F24D 13/024
52/220.1

* cited by examiner

ELECTRIC RADIANT HEATING ELEMENT POSITIONING MATS, AND RELATED METHODS

BACKGROUND

A popular method of heating a room is to dispose an electric radiant heating element inside a floor of the room and then allow the heat generated in the floor to radiate in toward the room. In this manner, the floor of the room, especially a tile floor, does not remain cold while the temperature inside the room is comfortable, and thus a person walking on the floor with bare feet does not suffer an unpleasantly cold feeling in his or her feet.

Unfortunately, the standard process for installing an electric radiant heating element inside a tile floor is time consuming and requires care to avoid damaging the electric radiant heating element. The process begins by determining the size and length of the heating element to be used. Such electric radiant heating elements generate heat by resisting the flow of electricity through them. Because the electrical resistance of a material depends on the cross-sectional area and length of the material in the direction that the electricity flows, electric radiant heating elements are sized according to the specific application that they will be used for. For a specific heating requirement, one determines the length of the heating element needed. The length depends on the area of the floor or wall and the desired spacing of the element within the floor or wall. As the spacing between portions of a heating element increases, the temperature that one can obtain in the room decreases. Typically, one loses about 5 degrees for each 0.5 inch increase in spacing. Once the area of the floor or wall and the spacing between portions of the heating element have been determined, one selects the heating element whose gauge (diameter) in combination with its length provides the desired resistance (heat).

Because the resistance of the heating element depends on both the cross-sectional area and the length of the element, one cannot cut an element to reduce its length. To do so would decrease the resistance of the heating element and thus increase the current flowing through the heating element's electric circuit, which can cause serious damage. So, many heating elements are made to a specific, common gauge and length combination; not to a gauge and length combination that is specifically designed for a specific room. Because of this, positioning the heating element in the floor requires flexibility, which is provided by metal straps specifically mounted to a backer board as discussed below.

Installing an electric radiant heating element over a plywood or concrete sub-floor typically involves five activities that are time consuming and if not performed carefully can damage the electric radiant heating element.

First, one applies a heavy tile backer board that is awkward to handle. The backer board typically weighs about 30 lbs. and is three feet by five feet by ¼ of an inch thick. One applies the backer board to the plywood by spreading a thinset mortar (a cement based adhesive), laying the backer board on top of the mortar, and then fastening the tile backer board to the plywood with screws or nails. To complete the application of the backer board, one then covers the joints between each board with a self adhesive fiberglass mesh tape and then fills in the joints and covers the tape with thinset mortar.

Next, one installs furring strips at the perimeter of the room that one will use to know when enough cement underlayment has been applied over the electric radiant heating element to protect the electric radiant heating element from damage while the floor's construction is completed. A furring strip is typically ¼ of an inch high by 1.0 inch wide, and is installed by cutting the strip to a desired length and then fastening the strip to a backer board with one or more nails. Typically, a room requires four or more furring strips.

Next, one fastens to the backer board a metal strap that includes multiple tabs for holding the electric radiant heating element to the backer board. The metal straps are typically fastened to the backer board with a nail or screw at about every six inches along the strap's length. This part of the installation process can be very time consuming because one must first determine where on the backer board to fasten the metal strap to provide the desired electric radiant heating element spacing. This specific mounting of the metal straps to the backer board provides one with the flexibility needed by allowing one to mount the metal straps anywhere on the backer board. If the floor includes an odd-shaped area, or if the electric radiant heating element is to be operatively connected to another room, then before one can determine where on the backer board to fasten the metal strap, one must wait until the electric radiant heating element has been mounted to the remaining area of the room or the other room. Also, this part of the installation process can be very time consuming because one then has to fasten each metal strap to the backer board. For a 10 ft by 10 ft room one would have to attach at leats two 9.5 ft long straps to the backer board, each strap having at least 19 nails or screws driven through the strap and into the backerboard.

Next, one inserts the electric radiant heating element into the tabs of the metal straps to mount the electric radiant heating element to the backer board. This part of the installation process requires care to not damage the electric radiant heating element on sharp edges of the metal straps and their tabs. The sharp edges can cut the protective exterior of the electric radiant heating element and can pinch the element, both of which can prevent the element from operating. Furthermore, one must be careful not to trip on or drop anything on the element to also avoid damaging the element.

Finally, one covers the electric radiant heating element with a cement underlayment, using the furring strips previously fastened at the perimeter of the room to determine when no more underlayment is needed. As one spreads the underlayment throughout the floor, one walks and kneels on the cable. Because this can also potentially damage the electric radiant heating element, one must spread the underlayment with care. Also, because the furring strips are attached at the perimeter only, one must exercise skill when spreading the underlayment to ensure that the thickness of the underlayment is consistent throughout the floor's area.

The process of installing an electric radiant heating element over a concrete sub-floor is very similar to the process described above except one applies a cork or foam over the concrete slab to insulate the slab from the heat radiated by the electric radiant heating element, and then applies a thin coat of cement underlayment directly to the surface of the rubber or vinyl membrane to give the floor some texture for the thicker layer of cement underlayment to adhere to. In addition, fastening the metal strap to the concrete sub-floor requires concrete nails or concrete screws whose installation requires pre-drilled holes in the concrete.

SUMMARY

In an embodiment, a mat includes a base and a plurality of studs that together may position an electric radiant heating element within a floor or wall, and may protect the electric radiant heating element as the floor or wall are constructed. The base extends in at least two directions that define a plane. Two or more of the plurality of studs has a cylindrical body that includes a surface and a top, the surface extends from a respective portion of the base in a third direction that does not lie within the plane and that is at an angle between and including 84 and 96 degrees relative to the respective base portion, and the top includes a hole to allow air to pass from outside the stud to an interior region. By using the mat one can quickly install an electric radiant heating element at desired locations in the floor while the floor is constructed. Furthermore, one can install the mat in odd-shaped rooms or in rooms that will use an electric radiant heating element that is a branch of another room's electric radiant heating element, without having to first wait for installation in other portions of the odd-shaped room or the other room to be completed.

By allowing air to pass from the outside of the stud to the interior region, adhesive that is used to secure the mat to a sub-floor may be quickly and thoroughly cured. This allows one to use the mat on a wood subfloor without having to mechanically fasten the mat to the floor before laying the heating element. Without a hole that allows air to pass from the outside of the stud to the interior region, conventional adhesive used to secure the mat to a wood subfloor typically requires days to cure before one can insert a heating element into the mat without moving the mat. To avoid this substantial down-time during the installation process, one typically mechanically fastens the mat to the wood subfloor after applying the adhesive. Allowing air to pass from the outside of the stud to the interior region also allows one to use the mat on a concrete subfloor without having to apply an expensive urethane based adhesive. On a concrete subfloor, because mechanical fastening is not possible one would have to use and expensive urethane adhesive or equivalent that requires little air exposure to cure quickly. With the hole in the mat, one may use an inexpensive vinyl adhesive or any other inexpensive multipurpose adhesive to secure the mat to a concrete subfloor. In addition, the hole in the stud may also allow moisture to escape from a concrete sub-floor to relieve hydrostatic pressure underneath the mat.

The tops of the studs can also serve the same function as the furring strips, thus eliminating the need to size and fasten furring strips at the perimeter of the room, and eliminating the need for a skilled person to spread the cement underlayment over the electric radiant heating element. Furthermore, one can walk and kneel on the tops of the studs, and if something is dropped, the tops of the studs will most likely prevent the item from contacting the electric radiant heating element, thus preventing damage to the element while the floor's construction is completed. Furthermore, the mat can effectively replace the heavier and more awkward backer board thus eliminating this part of the typical installation process. In addition, with the surface of a stud's cylindrical body extending at an angle between and including 84 and 96 degrees, the electric radiant heating element is more likely to remain where positioned while other sections of the element are inserted into the mat.

BRIEF DESCRIPTION OF THE DRAWINGS

FIG. 9b is a plan view of the portion of the mat in FIG. 9a.

DETAILED DESCRIPTION

Figure 1:
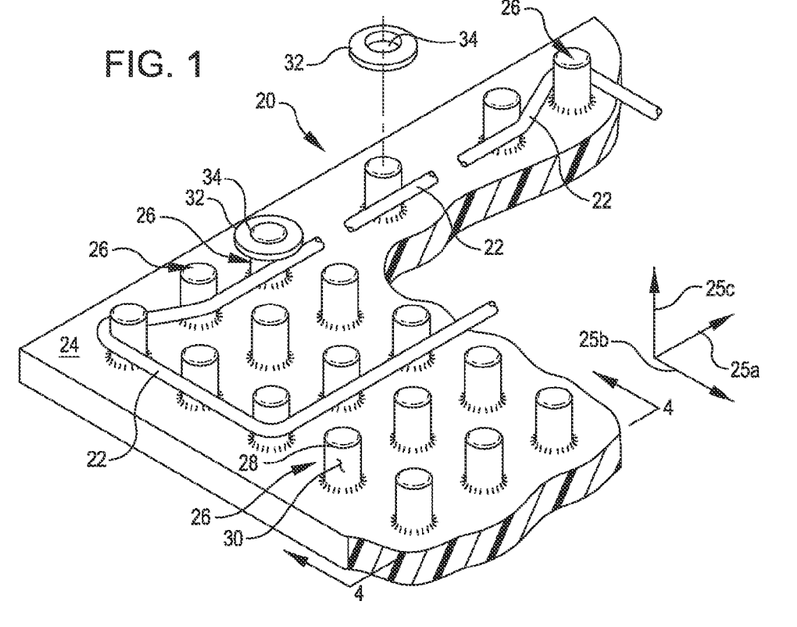
FIG. 1 is a perspective view of an electric radiant heating element positioning mat, according to an embodiment of the invention, with an electric radiant heating element disposed within it and spaced according to one embodiment.

FIG. 1 is a perspective view of an electric radiant heating element positioning mat 20 according to an embodiment of the invention. The mat 20 is used to position an electric radiant heating element 22 (only three sections shown for clarity) that generates heat within a wall or floor (not shown here but discussed in greater detail in conjunction with FIG. 8) and to protect the electric radiant heating element 22 while the wall or floor is constructed. The mat 20 includes a base 24 that extends in at least two directions 25a and 25b to form a plane, and a plurality of studs 26 (for clarity, only 18 shown four of which are labeled with the reference number 26) that extend from the base 24 in a third direction 25c that does not lie within the plane. To position the electric radiant heating element 22 in the wall or floor, the element 22 is placed between the base 24 and at least two of the studs 26 to contact the at least two studs 26 and base 24. Some of the studs 26 may be longer than the diameter of the cable to allow one to walk or stand on the mat 20 without pinching the electric radiant heating element 22, and thus protect the element 22 while one completes construction of the wall or floor that will include the mat 20.

Figure 2:
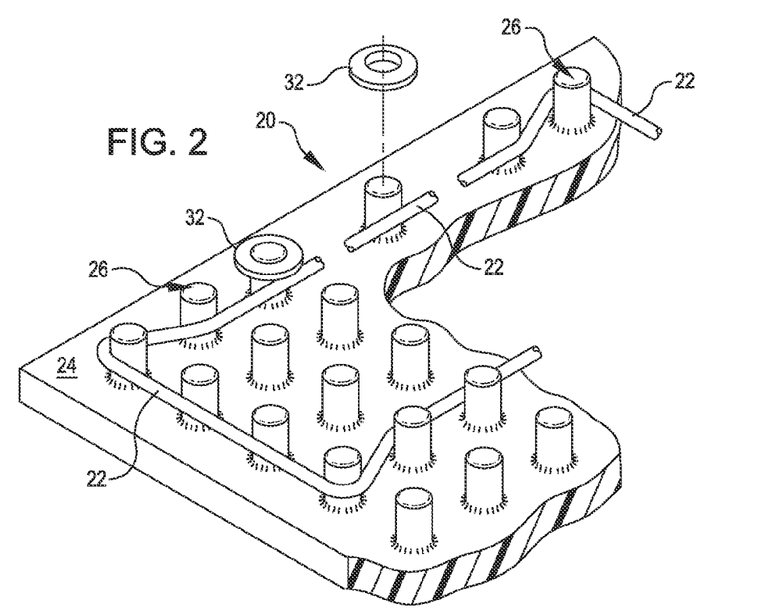
FIG. 2 is a perspective view of the electric radiant heating element positioning mat in FIG. 1 with an electric radiant heating element disposed within it and spaced according to another embodiment of the invention.
Figure 3:
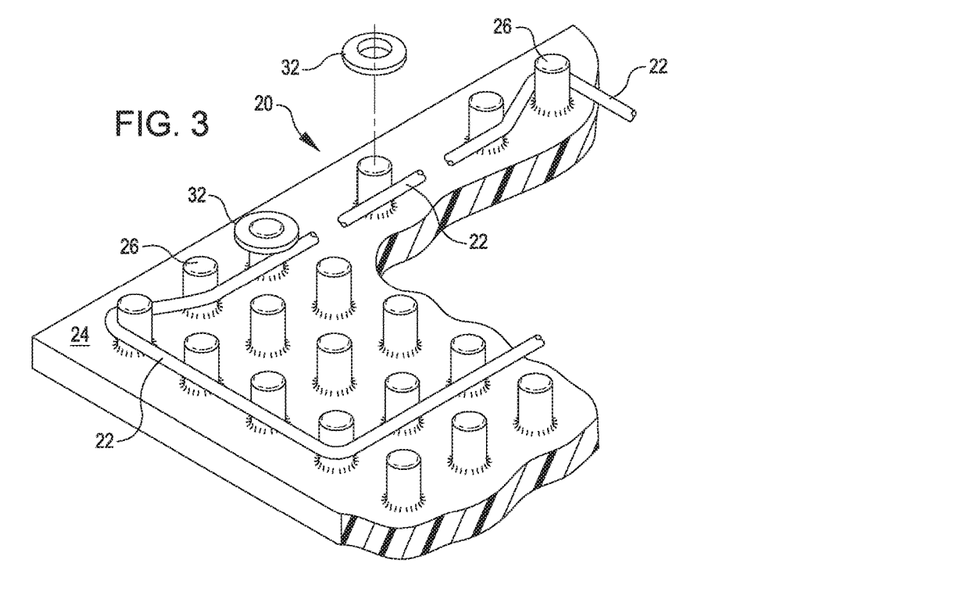
FIG. 3 is a perspective view of the electric radiant heating element positioning mat in FIG. 1 with an electric radiant heating element disposed within it and spaced according to yet another embodiment of the invention.

The size of each stud 26 may be any desired size, and the location of each stud 26 on the base 24 may be any desired location, both of which in combination allow one to position the electric radiant heating element 22 as desired. In this and certain other embodiments, for example, the base 24 may have a stud 26 extending from a respective portion of the base 24 such that the pattern of the studs 26 is similar to the pattern of the fifteen studs 26 shown in FIG. 1, i.e. a rectangular, and covers the whole base 24. In this and certain other embodiments, the diameter of each stud may be 0.50 inches, and the distance between each stud may be 1.0 inch center to center. With this stud size and spacing one can comfortably walk and kneel on the mat 20 without damaging the electric radiant heating element 22. With this stud size and spacing, one can also position the electric radiant heating element 22 in a serpentine pattern with at least two sections of the electric radiant heating element 22 running parallel to each other and spaced 2.0 inches apart (shown in FIG. 1), 2.5 inches apart (shown in FIG. 2) or 3.0 inches apart (shown in FIG. 3). Furthermore, in this embodiment, the height of some of the studs is 7/16 of an inch from the stud's respective portion of the base 24. With this height, the studs 26 may protect the electric radiant heating element 22 and provide sufficient depth for the cement underlayment.

With each stud 26 having a diameter of 0.50 inches, and each stud located 1.0 inch away from an adjacent stud 26 as measured center to center of each stud, the mat 20 provides substantial flexibility in the positioning of the heating element 22 during installation. With the mat 20, one can use a heating element having a specific gauge and length, in a variety of different sized rooms. This, in turn, makes installing the heating element easier and quicker. For example, with a heating element designed to cover 100 square feet at 2.5 inch spacing (FIG. 2), one can space the heating element at 2.0 inches apart (FIG. 1) to cover 80 square feet or one can space the heating element at 3.0 inches apart (FIG. 3) to cover 120 square feet. Because changing the spacing of the heating element 0.5 inches translates into a change of about 5 degrees in temperature, increasing the spacing reduces the local temperature by about 5 degrees, which a person would typically notice yet tolerate. And decreasing the spacing increases the local temperature by about 5 degrees, which a person would typically notice yet also tolerate. In contrast, however, with an incremental change in spacing being 1.0 inch, changing the spacing of the heating element from 2.0 inches to 1.0 inch causes a 10 degree increase in the local temperature, and changing the spacing of the heating element from 2.0 inches to 3.0 inches causes a 10 degree drop in the local temperature, both of which a person typically would not tolerate.

For another example, if one is going to use a heating element buried in the floor of an odd sized room to heat the room, then one can get a heating element whose length corresponds to the closest, larger room size and reduce the spacing of the heating element in a region of the room's floor to allow the whole heating element to be buried in the floor. Or, one can get a heating element whose length corresponds to the closest, smaller room size and lengthen the spacing of the heating element in a region of the room's floor to allow the whole heating element to be buried in the floor. If one selects the heating element whose length corresponds to the larger room size, then for a portion of the floor (preferably a portion that receives high traffic like the center of the floor) one can reduce the spacing of the heating element and have the temperature at this region be warmer than the remainder of the floor. If one selects the heating element whose length corresponds to the smaller room size, then for a portion of the floor (preferably a portion that receives low traffic like near an exterior wall) one can increase the spacing of the heating element and have the temperature at this region be cooler than the remainder of the floor.

Other embodiments are possible. For example, the pattern of the studs 26 may only cover a region of the base 24, not the whole base 24. In addition, the pattern of the studs 26 may form a circle, or multiple circles that may or may not be concentric with each other.

Still referring to FIG. 1, two or more of the studs 26 may include a cylindrical body 28 that includes a surface 30 that extends from a respective portion of the base 24 in the third direction 25c that does not lie within the plane, and at any desired angle. For example, in this and certain other embodiments the surface 30 may extend at an angle between and including 84 and 96 degrees relative to the respective base portion. Within this range of angles, the surface exerts pressure on a section of the electric radiant heating element 22 at an angle that does not tend to lift the electric radiant heating element out of the mat, when the electric radiant heating element is inserted between the surface 30 and the base 24. Thus, the surface 30 of the cylindrical body 28 helps hold the electric radiant heating element 22 at the desired position in the mat 20 when the element 22 is inserted between the surface 30 and the base 24. Other embodiments of the cylindrical body 28 with a surface 30 that extends at a specific angle within the range of angles 84 and 96 are discussed in greater detail in conjunction with FIGS. 4-9b.

The mat 20 may be made of any desired material using any desired technique. For example, in this and certain other embodiments the mat 20 may be made from conventional ABS plastic that is 0.060 inches thick using a conventional thermoforming process. With a thickness of 0.060 inches and a stud density of 1.77 per square inch, the mat 20 is durable enough for one to walk on without crushing the studs or pinching the electric radiant heating element disposed in the mat 20. A mat 20 formed accordingly typically includes hollow studs. Furthermore, underneath (the side opposite the studs 26) the mat 20 may include a mesh to allow the mat 20 to be secured to the sub-floor.

Other embodiments are possible. For example, the mat 20 can have a different thickness and include a different plastic. In addition, the mat 20 may be formed using a different process such as injection molding, thermosetting, or stamping. Furthermore, the studs 26 may be solid and attached to the base 24 as a separate job during the manufacturing process. Also, the mat 20 may not include a mesh to help adhere the mat 20 to the sub-floor. In such embodiments, an adhesive that does require a mesh for the adhesive to grab onto to hold the mat 20, may be used. In addition, the mat 20 can include a thermal insulating material to direct much of the heat from the electric radiant heating element 22 toward the surface of the floor and away from the sub-floor that lies beneath the electric radiant heating element 22.

Still referring to FIG. 1, the mat 20 may also include a grommet 32 to retain the electric radiant heating element 22 positioned between the stud 26 and the stud's respective base portion. For example, in this and certain other embodiments the grommet 32 may include a flexible rubber and a hole 34 whose diameter is slightly less than the diameter of the stud's cylindrical body 28. To retain a section of the electric radiant heating element 22 that is inserted between the surface 30 and the stud's respective base portion, one forces the top of the stud 26 into the hole 34. The grommet 32 remains in this position by friction between the grommet 32 and stud 26, and the pressure that the stretched grommet 32 exerts on the stud 26.

Figure 4:
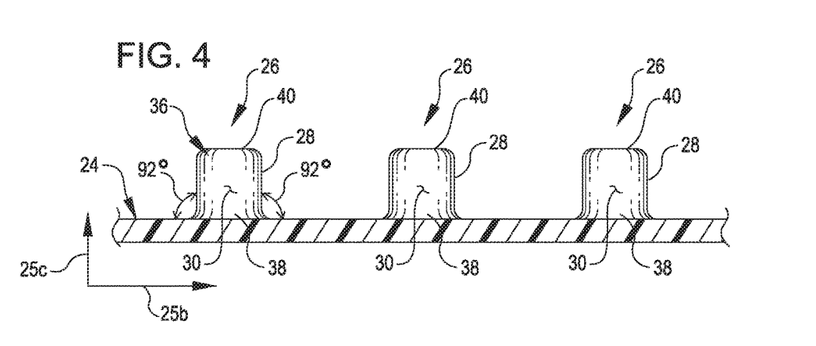
FIG. 4 is a cross-sectional view of a portion of the electric radiant heating element positioning mat in FIG. 1.

FIG. 4 is a cross-sectional view of a portion of the mat in FIG. 1, according to an embodiment of the invention. In this and certain other embodiments, each stud 26 of the mat 24 includes a cylindrical body 28 that has a surface 30 that is curved as shown by the contour lines 36. With the surface 30 curved, the contact surface of the body 28 that the electric radiant heating element (22 in FIG. 1) contacts when the element 22 is inserted between the stud 26 and the base 24 is smooth, that is does not include a sharp edge that can cut into or pinch the electric radiant heating element 22 and thus damage the element 22.

The surface 30 may be curved as desired. For example, in this and certain other embodiments the surface 30 is curved to form a cylinder and extends at an angle of 92° or substantially 92° relative to the base 24. Thus, the cylinder's first end 38 has a diameter that is wider than the diameter of the cylinder's second end 40. With such a draft angle, the studs 26 may be easily formed using a mold, and thus the mat 20 may be easily formed. Furthermore because the surface 30 extends from a respective base portion at an angle very close to 90°, the cylindrical body 28 may securely hold the electric radiant heating element 22 when a section of the electric radiant heating element 22 contacts the surface 30.

Other embodiments are possible. For example, one or more of the studs 26 when viewed from above may be shaped other than a circle. In addition, the body of the stud 26 may not be cylindrical but a curved plate that forms an arc or fin.

Figure 5:
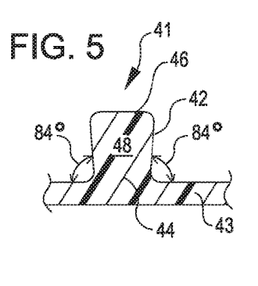
FIG. 5 is a cross-sectional view of a portion of another electric radiant heating element positioning mat, according to another embodiment of the invention.

FIG. 5 is a cross-sectional view of a portion of another electric radiant heating element positioning mat, according to another embodiment of the invention. In this and certain other embodiments, one or more of the studs 41 includes a body 42 that has a first end 44, a second end 46, and a surface 48 that extends from a base 43, where the first end 44 is located, toward the second end 46. In this and certain other embodiments, the diameter of the first end 44 is thinner than the diameter of the second end 46, and the surface 48 extends at an angle of 84° or substantially 84°. With this angle, the surface 48 urges the electric radiant heating element (22 in FIG. 1) toward the base 43, and thus securely holds the element 22 when a section of the element 22 contacts the surface 48.

Figure 6:
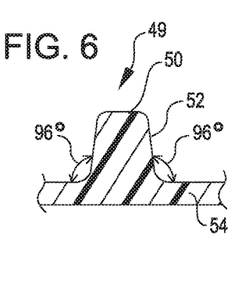
FIG. 6 is a cross-sectional view of a portion of another electric radiant heating element positioning mat, according to another embodiment of the invention.

FIG. 6 is a cross-sectional view of a portion of yet another electric radiant heating element positioning mat according to yet another embodiment of the invention. In this and certain other embodiments, one or more of the studs 49 includes a body 50 that is similar to the body 28 in FIG. 4 except that the angle that the surface 52 extends from a base 54 is 96° or substantially 96°.

Figure 7:
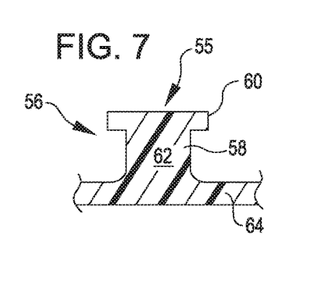
FIG. 7 is a cross-sectional view of a portion of yet another electric radiant heating element positioning mat, according to yet another embodiment of the invention.

FIG. 7 is a cross-sectional view of a portion of another electric radiant heating element positioning mat according to another embodiment of the invention. In this and certain other embodiments, one or more of the studs 55 includes a body 56 that has a first cylinder 58 and a second cylinder 60. The first cylinder 58 has a surface 62 that extends from a base 64 toward the second cylinder 60 at an angle between and including 84° and 96°. The second cylinder 60 is disposed on the end of the first cylinder 58 that is opposite the base 64 and includes a diameter that is wider than the first cylinder's diameter. With the second cylinder sized and located relative to the first cylinder in this manner, one does need to use a grommet (32 in FIG. 1) to help hold an electric radiant heating element (22 in FIG. 1) when the element 22 is disposed between the base 64 and the surface 62.

Figure 8:
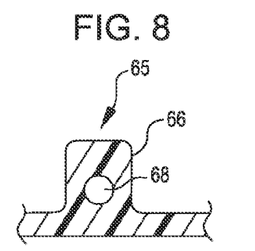
FIG. 8 is a cross-sectional view of a portion of yet another electric radiant heating element positioning mat, according to yet another embodiment of the invention.

FIG. 8 is a cross-sectional view of a portion of yet another electric radiant heating element positioning mat according to yet another embodiment of the invention. In this and certain other embodiments, one or more of the studs 65 includes a body 66 that has a hole 68 located and sized as desired, and through which an electric radiant heating element (26 in FIG. 1) can extend to more securely hold the element 22 at the desired location in the mat. In other embodiments, the body 66 may include two or more holes 66 located as desired.

Figure 9A:
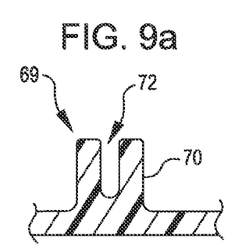
FIG. 9a is a cross-sectional view of a portion of still another electric radiant heating element positioning mat, according to still another embodiment of the invention.
Figure 9B:
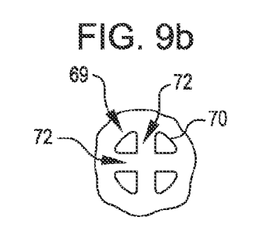

FIG. 9a is a cross-sectional view of a portion of still another electric radiant heating element positioning mat according to still another embodiment of the invention. FIG. 9b is a plan view of the portion of the mat in FIG. 9a. In this and certain other embodiments, one or more of the studs 69 includes a body 70 that has two grooves 72 oriented and sized as desired, into which an electric radiant heating element (26 in FIG. 1) can extend to more securely hold the element 22 at the desired location in the mat. In other embodiments, the body 70 may include only one groove 72 oriented and sized as desired, or more than two grooves 72 oriented and sized as desired.

Figure 10:
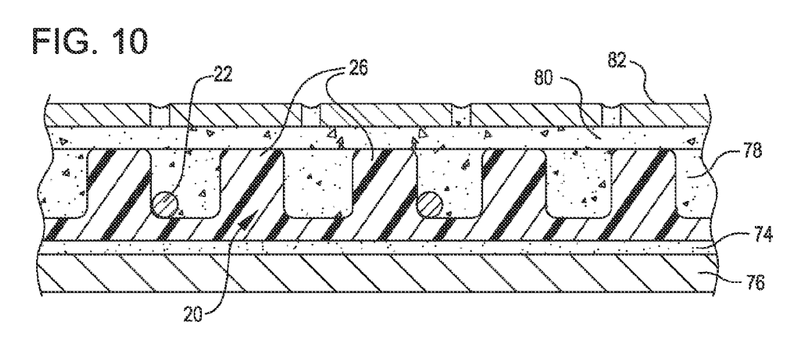
FIG. 10 is a cross-sectional view of a portion of the mat in FIG. 1.

FIG. 10 is a cross-sectional view of a portion of the mat in FIG. 1 included in a completed floor. An example process for installing the mat 20 into a floor, and completing the floor is described below, and as will be evident, is not as time consuming and does not require a great amount of skill. Consequently, installing the mat 20 into a floor is easy, and thus constructing a floor to provide radiant heat is easier and more cost effective than it used to be.

In this and certain other embodiments of the installation process, the process includes four activities. First, one applies a non-cementitious adhesive, such as vinyl adhesive, any multi-purpose adhesive, and any urethane adhesive 74 on the sub-floor 76, which may be plywood, oriented-strand-board (OSB), or concrete. Next, one applies the mat 20 by simply laying it on the adhesive 74. Next, one inserts the electric radiant heating element 22 as desired to provide the desired spacing and pattern that will provide the desired heat distribution throughout the floor when the electric radiant heating element 22 radiates heat. Next, one applies a bonding agent, such as a cement bonding agent (or primer). Next, one applies cement underlayment 78 to fill the volumes between the studs 26, and stops applying the underlayment 78 when the underlayment 78 is level with the tops of the studs 26. To complete the construction of the floor, one may then apply a layer 80 of thinset mortar to secure one or more tiles 82 to the sub-floor system. Next, one may then mount one or more tiles to the thinset layer 80 to complete the construction of the floor.

Figure 11:
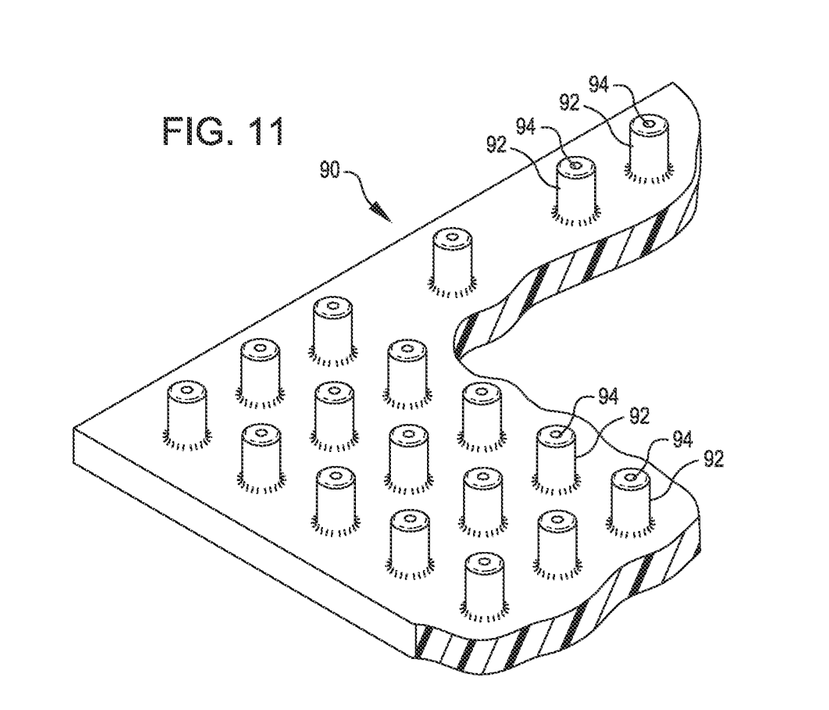
FIG. 11 is a perspective view of an electric radiant heating element positioning mat, according to another embodiment of the invention.

FIG. 11 is a perspective view of an electric radiant heating element positioning mat 90, according to another embodiment of the invention. The mat 90 is similar to the mat 20 (FIGS. 1-3) and includes a plurality of studs 92 that are similar to the studs 26 (FIG. 1) of the mat 20 except that one or more of the studs 92 includes a hole 94 to allow air to pass from outside the stud 92 to the interior 96 (FIG. 12) of the stud 92. In other embodiments one or more of the studs 92 may include two or more holes 94. By allowing air to pass from the outside of the stud 92 to the interior 96, adhesive 74 (FIG. 10) that is used to secure the mat 90 to the sub-floor 76 (FIG. 10) may be quickly and thoroughly cured. This allows one to use the mat 90 on a wood subfloor without having to mechanically fasten the mat 90 to the floor before laying the heating element. The hole 94 in the stud 92 may also allow moisture to escape from a concrete sub-floor to relieve hydrostatic pressure underneath the mat 90.

Figure 12:
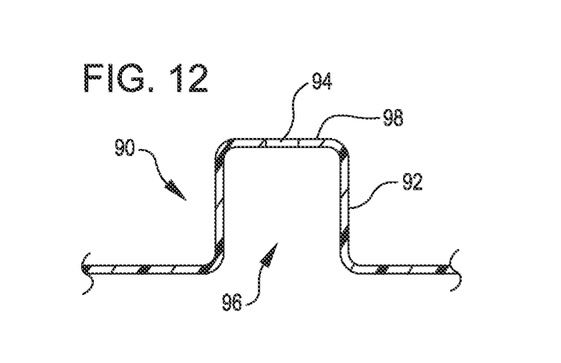
FIG. 12 is a cross-sectional view of a stud included in the mat shown in FIG. 11, according to an embodiment of the invention.

FIG. 12 is a cross-sectional view of a stud 92 included in the mat 90 shown in FIG. 11, according to an embodiment of the invention. The hole 94 in the stud 92 may be located on the stud at any desired location, and may be configured as desired. For example, in this and certain other embodiments the hole 94 is located on the top of the stud, circular, and has a diameter of 0.065 inches. In other embodiments, the hole 94 may be located on the side of the stud 92 and may have a smaller or larger diameter. In still other embodiments, the hole 94 may be square, triangular, or rectangular.

The studs 92 include a top 98 to provide structural support for the stud 92 and to prevent the interior 96 from filling up with cement underlayment 78. This also allows one to use less underlayment 78 when installing the mat 90 in a floor.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A mat for positioning an electric radiant heating element in a floor or wall, and for protecting the electric radiant heating element while the floor or wall is constructed, the mat comprising:
    a base that extends in at least two directions that define a plane; and
    a plurality of studs, two or more of which have a cylindrical body that includes a surface and a top, the surface extends from a respective portion of the base in a third direction that does not lie within the plane and that is at an angle between and including 84 and 96 degrees relative to the respective base portion, and the top includes a hole having a diameter that is at most 0.065 inches to allow air to pass from outside the stud to an interior region but not allow cement underlayment to enter the interior region.

2. The mat of claim 1 wherein:
    each body includes a cylinder having a curved surface extending between two ends, and
    the curved surface of each cylinder is the surface of each respective cylindrical body that extends from the base in the third direction.

3. The mat of claim 1 wherein the top includes two holes.

4. The mat of claim 1 wherein the surface includes a hole to allow air to pass from outside the stud to an interior region.

5. The mat of claim 1 wherein:
    each body includes a cylinder having a curved surface extending between a first end and a second end that includes the top, wherein the first end includes a circular face that has a first diameter, and the second end includes a circular face that has a second diameter that is smaller than the first diameter,
    the first end of each cylinder is closer to the respective base portion of the mat than the second end,
    the curved surface of each cylinder is the surface of each respective cylindrical body that extends from the base in the third direction, and
    the angle formed between the third direction that the surface of each respective cylindrical body extends and the respective base is 92 degrees.

6. The mat of claim 1 wherein:
    each body includes a cylinder having a curved surface extending between a first end and a second end that includes the top, wherein the first end includes a circular face that has a first diameter, and the second end includes a circular face that has a second diameter that is smaller than the first diameter,
    the first end of each cylinder is closer to the respective base portion of the mat than the second end,
    the curved surface of each cylinder is the surface of each respective cylindrical body that extends from the base in the third direction, and
    the angle formed between the third direction that the surface of each respective cylindrical body extends and the respective base is 96 degrees.

7. The mat of claim 1 wherein:
    each body includes:
        a first cylinder having a curved surface extending from an end, and
        a second cylinder disposed adjacent to the first cylinder and opposite the end of the first cylinder; and
    the curved surface of each first cylinder is the surface of each respective cylindrical body that extends from the base in the third direction.

8. The mat of claim 1 wherein:
    each body includes a cylinder having a curved surface extending between two ends, and a slot extending through the cylinder, and
    the curved surface of each cylinder is the surface of each respective stud's cylindrical body that extends from the base in the third direction.

9. The mat of claim 1 wherein:
    each body includes a hollow cylinder having a curved surface extending between two ends, and
    the curved surface of each cylinder is the surface of each respective cylindrical body that extends from the base in the third direction.

10. The mat of claim 1 wherein:
    each body includes a cylinder having a diameter of approximately 0.5 inches and a curved surface extending between two ends, and
    the curved surface of each cylinder is the surface of each respective cylindrical body that extends from the base in the third direction.

11. The mat of claim 1 wherein:
    each body includes a cylinder having a diameter of approximately 0.5 inches, a longitudinal length of approximately 5/16 of an inch, and a curved surface extending between two ends, and
    the curved surface of each cylinder is the surface of each respective cylindrical body that extends from the base in the third direction.

12. The mat of claim 1 wherein:
    each body includes a cylinder having a diameter of approximately 0.5 inches, a longitudinal length of approximately 7/16 of an inch, and a curved surface extending between two ends, and
    the curved surface of each cylinder is the surface of each respective cylindrical body that extends from the base in the third direction.

13. The mat of claim 1 wherein:
    each cylindrical body includes a longitudinal axis,
    each cylindrical body is located relative to an adjacent cylindrical body in the first direction such that the distance between the two bodies' axes is 3 inches or less, and
    each cylindrical body is located relative to an adjacent body in the second direction such that the distance between the two bodies' axes is 3 inches or less.

14. The mat of claim 1 further comprising a grommet mountable to one or more of the plurality of studs and operable to retain an electric radiant heating element positioned between the stud and the stud's respective base portion.

15. A floor comprising:
an electric radiant heating element operable to generate heat; and
a mat for positioning the electric radiant heating element in the floor and for protecting the electric radiant heating element while the floor is constructed, the mat comprising:
  a base that extends in at least two directions that define a plane and that include a first direction perpendicular to a second direction; and
  a plurality of studs, at least two of which has a cylindrical body that includes a surface and a top, the surface extends from a respective portion of the base in a third direction that does not lie within the plane and that is at an angle between and including 84 and 96 degrees relative to the respective base portion, and the top includes a hole having a diameter that is at most 0.065 inches to allow air to pass from outside the stud to an interior region, but not allow cement underlayment to enter the interior region.

16. A method for constructing a floor or wall that includes an electric radiant heating element, the method comprising:
placing a mat on a surface of a sub-floor component, wherein the mat includes:
  a base that extends in at least two directions that define a plane and that include a first direction perpendicular to a second direction, and
  a plurality of studs, at least two of which has a cylindrical body that includes a surface and a top, the surface extends from a respective portion of the base in a third direction that does not lie within the plane and that is at an angle between and including 84 and 96 degrees relative to the respective base portion, and the top includes a hole having a diameter that is at most 0.065 inches to allow air to pass from outside the stud to an interior region, but not allow cement underlayment to enter the interior region; and
  inserting a section of the electric radiant heating element between a surface of at least one of the cylindrical bodies and the body's respective base portion.

17. The method of claim 16 wherein inserting a section of the electric radiant heating element includes inserting a plurality of adjacent sub-sections of the element into respective, adjacent regions of the mat wherein each region includes a cylindrical body and the body's respective base portion, and wherein the inserted portions of the element form a pattern that includes at least two sections parallel to each other and approximately 2.0 inches apart.

18. The method of claim 16 wherein inserting a section of the electric radiant heating element includes inserting a plurality of adjacent sub-sections of the element into respective, adjacent regions of the mat wherein each region includes a cylindrical body and the body's respective base portion, and wherein the inserted portions of the element form a pattern that includes at least two sections parallel to each other and approximately 2.5 inches apart.

19. The method of claim 16 wherein inserting a section of the electric radiant heating element includes inserting a plurality of adjacent sub-sections of the element into respective, adjacent regions of the mat wherein each region includes a cylindrical body and the body's respective base portion, and wherein the inserted portions of the element form a pattern that includes at least two sections parallel to each other and approximately 3.0 inches apart.

20. The method of claim 16 further comprising inserting a grommet onto the at least one cylindrical body to retain the electric radiant heating element.

* * * * *